(12) United States Patent
Blase

(10) Patent No.: US 6,371,876 B1
(45) Date of Patent: Apr. 16, 2002

(54) POWER SUPPLY CHAIN

(75) Inventor: Gunter Blase, Bergisch Gladbach (DE)

(73) Assignee: Igus SpritzguBteile fur die Industrie GmbH (DE)

( * ) Notice: Subject to any disclaimer, the term of this patent is extended or adjusted under 35 U.S.C. 154(b) by 0 days.

(21) Appl. No.: 09/402,921

(22) PCT Filed: Apr. 7, 1998

(86) PCT No.: PCT/DE98/01004

§ 371 Date: Dec. 20, 1999

§ 102(e) Date: Dec. 20, 1999

(87) PCT Pub. No.: WO98/46906

PCT Pub. Date: Oct. 22, 1998

(30) Foreign Application Priority Data

Apr. 14, 1997 (DE) .......................................... 197 15 531

(51) Int. Cl.[7] ................................................ F16C 13/16
(52) U.S. Cl. ........................................ 474/206; 59/78.1
(58) Field of Search ................................ 474/206, 207; 59/78.1; 248/49, 50, 51; 137/355.16, 355.17

(56) References Cited

U.S. PATENT DOCUMENTS

| | | | |
|---|---|---|---|
| 3,503,578 A | * | 3/1970 | Kurlandsky .................. 248/51 |
| 3,782,670 A | | 1/1974 | Kielma |
| 4,590,961 A | | 5/1986 | Schumann |
| 5,108,350 A | | 4/1992 | Szpakowski |
| 5,247,961 A | * | 9/1993 | Micheau et al. ....... 137/355.16 |
| 5,724,803 A | * | 3/1998 | Pea ............................. 59/78.1 |
| 5,987,873 A | * | 11/1999 | Blase .......................... 59/78.1 |

FOREIGN PATENT DOCUMENTS

| | | | |
|---|---|---|---|
| DE | 2360227 | 6/1975 | |
| DE | 2852075 | 6/1980 | |
| DE | 4325259 | 2/1995 | |
| EP | 0499784 | 8/1992 | |
| JP | 5-141481 A | * 6/1993 | ................. 59/78.1 |

* cited by examiner

*Primary Examiner*—Thomas R. Hannon
(74) *Attorney, Agent, or Firm*—Reising, Ethington, Barnes, Kisselle, Learman & McCulloch, P.C.

(57) ABSTRACT

In an energy guiding chain (1) for guiding cables, hoses and the like between two connection points, with several chain straps which are connected to one another via upper and lower cross-members in detachable fashion and assembled in two parallel strands, and which overlap one another and can be angled, there are alternating chain storage (2) designed as inner straps (3) with inner overlap areas (5) and as outer straps (4) with outer overlap areas (5) in each chain strand. The angling of the chain straps (2) relative to one another is restricted by stops (8, 9, 12, 13) located in the overlap areas (5). The curvature of the chain (1) is defined by the position of the stops (8, 9, 12, 13). If the stops (8, 9, 12, 13) in the inner and outer straps (3, 4) are positioned asymmetrically with respect to the center axis running in the longitudinal direction of the chain (S2) as the axis of symmetry, it is possible to produce two different bending behaviors in the energy guiding chain (1) using the same inner and outer straps (3, 4), depending on the orientation of the straps (3, 4) with respect to the longitudinal direction of the chain.

21 Claims, 2 Drawing Sheets

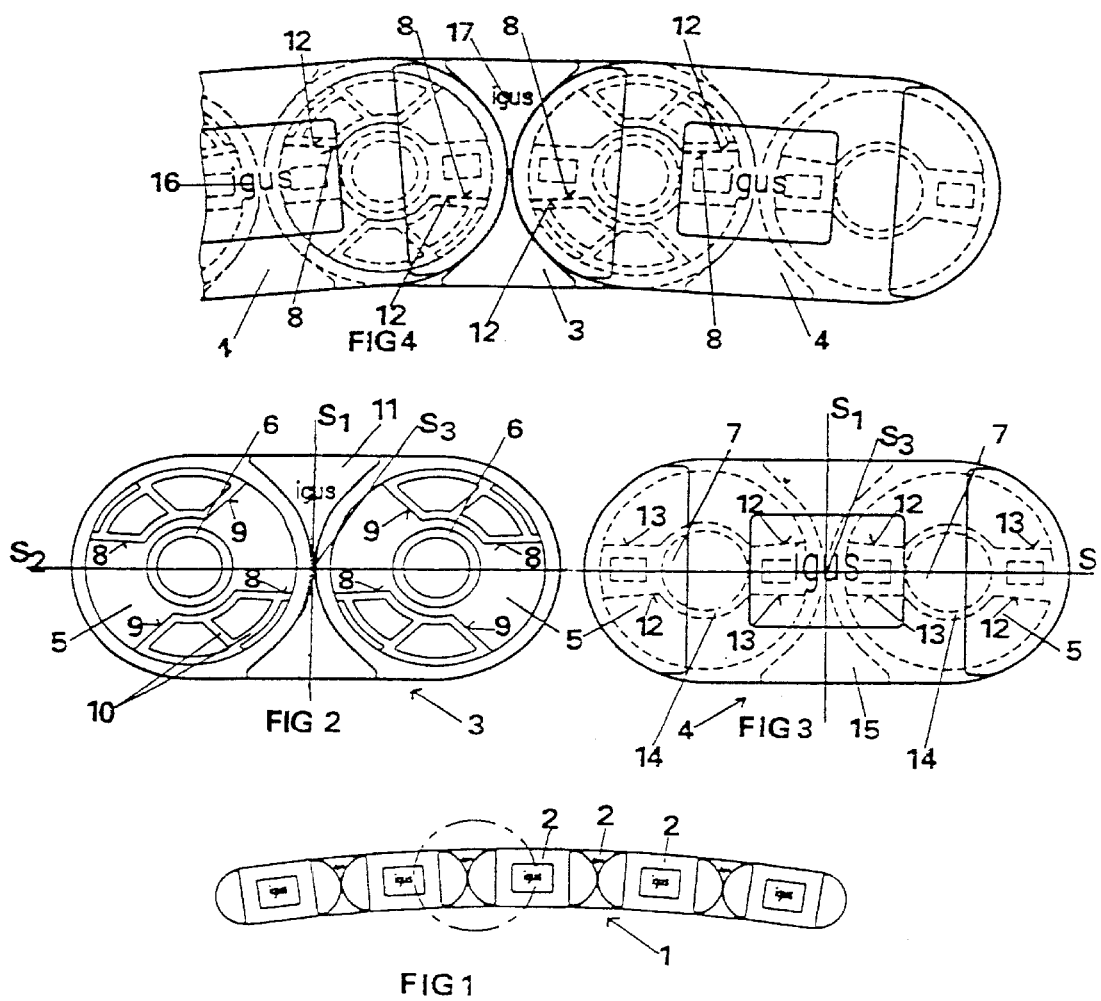

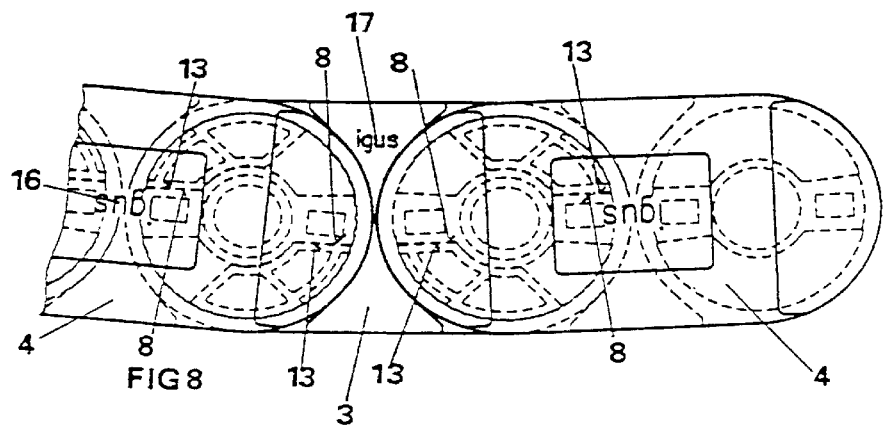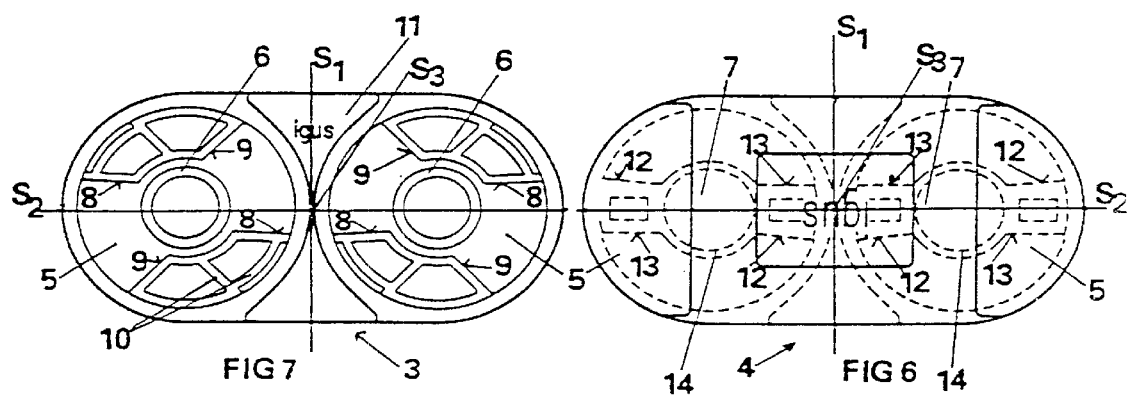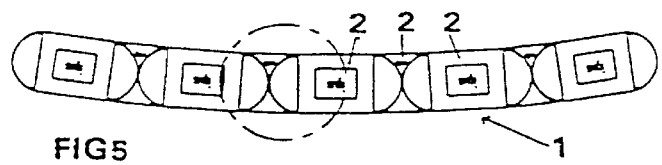

POWER SUPPLY CHAIN

The invention relates to an energy guiding chain for guiding hoses, cables and the like between two connection points relatively movable with respect to each other, said chain comprising a substantially straight lower strand followed by a curved section and a self-supporting upper strand, with several chain straps which are connected to one another via upper and lower cross-members in detachable fashion and assembled into parallel strands, and which overlap one another and can be angled around axes of rotation, where chain straps designed as inner straps with inner overlap areas and as outer straps with outer overlap areas alternate with one another in each chain strand, and where the inner and outer straps are respectively opposite to one another in the two chain strands, and where stops each comprising first stop surfaces for restricting the bending of the curved section and second stop surfaces for restricting the bending of the self-supporting section of the upper strand, and where the stop surfaces of the inner straps are positioned asymmetrically with respect to mirroring at the centre plane containing the axes of rotation.

Energy guiding chains of this kind require different radii of curvature of the curved section as well as different curvatures of the upper strand depending on their various applications. In this way the shape of the upper strand depends essentially on the length of the travel path, the load and other conditions. In this context, a distinction is made between chains with a self-supporting upper strand and chains with a sliding upper strand (following a self-supporting section behind the curved section). In the case of a self-supporting upper strand, the energy guiding chain is freely suspended above the lower strand and the floor. The curvature of the self-supporting upper strand can vary. The super-elevation of the upper strand in the self-supporting section is referred to as pretension. The upper strand of a self-supporting chain can also be straight or sagging. In the case of a sliding upper strand, the energy guiding chain is bent through more than 180° in the curved section, so that the upper strand rests on the lower strand after a certain distance. In chains with a sliding upper strand, the distance after which the upper strand rests on the lower strand or the floor is determined by the curvature of the upper strand. In order to prevent the sliding upper strand of a chain from flying up due to the tensile and transverse forces occurring during travel in combination with possible unevenness in the slide rail or in the lower strand on which the upper strand slides, the upper strand is not under pretension in the case of long travel paths.

The bending behaviour of the energy guiding chain is essentially determined by the arrangement of the stops, and the weight of the chain and the lines contained inside.

Energy guiding chains of this kind are known from DE 43 25 259 A1. The chains consist of chain straps connected to one another in detachable fashion by cross-members. The chain straps assembled to form a strand can be angled with respect to one another. In this context, the inner straps and outer straps represent the different types of chain straps. The types differ by, among other things, the arrangement of the overlap areas where they are linked to one another in a manner permitting angling. Based on two chain strands arranged parallel to one another which form a guide cavity, the inner straps/outer straps are those chain straps which are mounted on the inside/outside in the overlap area. Stops are provided in the overlap areas of the chain straps to restrict the angling of the chain straps relative to one another. In this context, the stops in the outer straps are positioned symmetrically with respect to mirroring at the centre plane containing the axes of rotation. The stops in the inner straps are positioned asymmetrically with respect to mirroring at this centre plane.

A disadvantage of the known energy guiding chains is that different inner and outer straps must respectively be provided for different curvatures of the curved section and of the self-supporting section of the upper strand, this increasing the manufacturing and stock-keeping costs.

In reference to this prior art, the invention is based on the task of providing energy guiding chains with different radii of curvature and different upper strand paths, which are simple and economical to manufacture.

According to the invention, the task is solved in that the stop surfaces of the outer straps are positioned asymmetrically with respect to mirroring at the centre plane, such that in case of a change of the orientation of 180° either of the inner straps or of the outer straps around the centre axis running in the middle between the two axes of rotation and parallel thereto the self-supporting section of the upper strand and/or the curved section of the chain obtains a different curvature.

By the above-mentioned change of orientation by 180° it is meant that the respective straps (inner and outer straps, respectively) are arranged in a position which is rotated by 180° around said centre axis in the chain, whereas the other straps (outer straps and inner straps, respectively) maintain their position.

By means of the asymmetrical position of the stop surfaces of the inner and outer straps according to the invention it is possible to realize two different radii of curvature for the self-supporting section of the upper strand and/or the curved section of the chain with only two different types of straps, namely the inner and the outer straps. The prior art required at least three different straps to achieve the same effect.

In a preferred configuration of the energy guiding chain according to the invention, the stop surfaces of the inner straps and the outer straps are positioned asymmetrically with respect to the centre plane in such a way that after changing the orientation either of the inner straps or of the outer straps about the centre axis by an angle of 180° the curved section receives a slightly different curvature. With this means, for example, an energy guiding chain with a self-supporting, straight upper strand with pretension can be converted into a chain with a self-supporting, sagging upper strand. A change can also be performed between other shapes of the upper strand.

In a preferred configuration of the energy guiding chain according to the invention, the stop surfaces are positioned mirror-symmetrically with respect to the centre axis of the chain straps running perpendicular to the longitudinal direction of the chain. As a result of this design the straps opposite one another in the chain strands can each consist of identically designed inner and outer straps, this reducing the manufacturing and assembly costs. Furthermore this offers the advantage that the identical inner and outer straps positioned opposite one another in the two chain strands ensure optimum straight running of the chain, since manufacturing defects of separately manufactured opposite straps cannot sum up.

In particular, the chain straps provided for a change of their orientation by an angle of 180° are the outer straps.

In a preferred configuration, the stop surfaces of the inner straps are positioned with a relatively strong asymmetry with respect to mirroring at the centre plane containing the axes of rotation, whereas the stop surfaces of the outer straps are positioned slightly asymmetrically with respect to this plane. A change of orientation of the outer straps by 180° therefore can lead to the desired change of the shape of the upper strand. Thereby also a change of the radius of curvature of the energy guiding chain in the curved section occurs. This change, however, lies within the range of permissible tolerances, if the asymmetry of the stop surfaces is not too high.

In this context the first stop surfaces of the outer straps can be parallel and the second stop surfaces of the outer surfaces can be slightly inclined with respect to the centre plane containing the axes of rotation.

The chain straps on the outer sides of the chain strands can be provided with a marking in order to facilitate manipulation and accurate determination of the orientation of the chain straps. Thus, the orientation of the straps can always be determined from the relative position of the marking of the inner strap and the outer strap.

In an advantageous configuration of the energy guiding chain according to the invention, double-acting stops, generally known in the prior art, are provided, each of which comprising two stop surfaces for restricting the curvature of the curved section and the self-supporting upper strand, respectively.

The invention is described below based on a practical example illustrated in the associated drawings. The drawings show the following:

FIG. 1 A section of a self-supporting upper strand of an energy guiding chain under pretension, FIG. 2 An inner strap of the chain section shown in FIG. 1, FIG. 3 An outer strap of the chain section shown in FIG. 1, FIG. 4 A cut-out of the chain section shown in FIG. 1 with two outer straps and one inner strap, FIG. 5 A sagging section of a self-supporting upper strand of an energy guiding chain, FIG. 6 An outer strap of the chain section shown in FIG. 5, FIG. 7 An inner strap of the chain section shown in FIG. 5, and FIG. 8 A cut-out of the chain section shown in FIG. 5 with two outer straps and one inner strap.

As the drawings show, particularly FIGS. 1 and 5, energy guiding chain 1 consists of several chains straps 2 connected to form strands. In a chain strand, inner straps 3 and outer straps 4 alternate with one another and are connected in overlap areas 5 in a manner such that they can be angled.

Inner strap 3, illustrated in FIGS. 2 and 7, exhibits a round projection 6 in overlap area 5. Inner strap 3 is connected to outer strap 4 by locating round projection 6 in round recess 7 of overlap area 5 of outer strap 4.

The figures show that inner strap 3 and outer strap 4 are mirror-symmetrical with respect to the centre plane S, arranged perpendicularly to the longitudinal direction of the chain. In the chain strands, the opposite identical chain straps 2 are arranged in an orientation rotated with respect to each other by an angle of 180° around the centre axis running perpendicular to the axes of rotation.

Each overlap area 5 of inner strap 3 exhibits two stop surfaces 8 and 9 of different orientation. In this context, the first stop surface 8 is parallel to longitudinal direction of the chain. Stop surface 9 encloses an angle with longitudinal direction of the chain. The two stop surfaces 8 and 9 are connected to one another via ribs 10, which serve to stabilise stop surfaces 8 and 9.

Similar to projection 6, stop surfaces 8 and 9 protrude out of overlap area 5 of inner strap 3. Web 11, separating overlap areas 5, also protrudes out of the inner strap.

Outer strap 4 is provided with two stop surfaces 12 and 13 arranged in different positions. As FIGS. 3 and 6 show, stop surface 13 is parallel to longitudinal direction of the chain in this context. Stop surface 12 encloses an angle with longitudinal direction of the chain. In order to stabilise stop surfaces 12 and 13, they are connected to one another by way of wall 14 delimiting round recess 7. Outer strap 4 also has a web 15 separating the two overlap areas 5.

If inner and outer straps 3 and 4 are assembled as illustrated in FIG. 4, the angling of the chain straps relative to one another is achieved by the interaction of stop surfaces 9 and 13, or by stop surfaces 8 and 12. Stop surfaces 8, 9, 12 and 13 are designed as double-acting stops, in that two of them respectively act together in pairs.

The angle of energy guiding chain 1 in the curved section is determined by the meeting of surfaces 9 and 13. The figures show that, as a result of the parallel position of stop surface 13 in relation to longitudinal direction of the chain, the angle in the curved section of the energy guiding chain is determined by the angle of stop surface 9 to longitudinal direction of the chain.

If inner and outer straps 3 and 4 are angled as illustrated in FIG. 4, the limit of the angle is defined by the interaction of stop surfaces 8 and 12. The figures show that straps 3 and 4 in the selected orientation result in a chain strand whose upper strand is under pretension. As stop surface 8 is parallel to longitudinal direction of the chain, the path of the upper strand is essentially determined by the angle of inclination of stop surface 12 with respect to longitudinal direction of the chain.

If outer strap 4 is inserted into inner strap 3 in the other orientation, as shown in FIG. 5, the latter must be rotated through 180° about centre axis S3 in the plane of the drawing. In order to more easily determine the orientation of inner and outer straps 3, 4, they are provided with markings 16 and 17 on the sides visible from the outside.

If inner and outer straps 3 and 4 are assembled in the orientation illustrated in FIG. 8, the limits of the angle are defined by the orientation of stop surfaces 12 and 9, or 13 and 8.

In this context, the orientation of the two stop surfaces 9 and 12 determines the radius of the curved section of energy guiding chain 1. Due to the small angle of inclination of stop surface 12 relative to longitudinal direction of the chain, the limiting angle in the curved section is slightly smaller than in the other corresponding orientation of outer strap 4. As the deviation from the stop surface 13 lying parallel to the centre plane $S_2$ is only slight, the change in the radius of curvature is minimal and thus tolerable.

The orientation of stop surfaces 8 and 13 restricts the angling of two chain straps in the opposite direction. This determines the curvature of the self-supporting section of the upper strand. The parallel orientation of stop surfaces 8 and 13 with respect to longitudinal direction of the chain S2 indicates that the upper strand has a geometrically straight path. Due to the forces of weight of the chain straps, and of the cables, hoses and the like guided inside the chain, acting on the upper strand, and due to the elastically flexible plastic material of straps 2, this orientation of stop surfaces 8 and 13 results in a self-supporting, sagging upper strand, as illustrated in FIG. 8.

What is claimed is:

1. Energy guiding chain (1) for guiding hose and cables between two connection points relatively movable with respect to each other, said chain comprising a substantially straight lower strand followed by a curved section and a self-supporting section of an upper strand, with several chain straps (2) which are assembled into parallel strands and connected to one another via upper and lower crossmembers in detachable fashion and which overlap one another and can be angled around axes of rotation, where chain straps (2) designed as inner straps (3) with inner overlap areas (5) and as outer straps (4) with outer overlap areas (5) alternate with one another in each chain strand, and where the inner and outer straps (3,4) are respectively opposite to one another in the two chain strands, and where a first stop and a second stop are provided, said first stop comprising a first stop surface (9) and a second stop surface (13) located, respectively, on inner scrap 3 and outer strap 4 for restricting the bending of the curved section and said second stop comprising a third stop surface (8) and a fourth stop surface (12) located, respectively, on inner strap 3 and outer strap 4 for restricting the bending of the self-supporting section of the upper strand, and where the first and third stop surfaces (9,8) of the inner straps (3) are positioned asymmetrically with respect to mirroring at the centre plane ($S_2$) containing the axes of rotation, characterised in that the second and fourth stop surfaces (13,12) of the outer straps (4) are positioned asymmetrically with respect to mirroring at the centre plane ($S_2$), such that in case of a change of the orientation of 180° either of the inner straps (3) or of the outer straps (4) around the centre axis ($S_3$) running in the middle between the two axes of rotation and parallely thereto the self-supporting section of the upper strand and/or the curved section of the chain obtains a different curvature.

2. Energy guiding chain according to claim 1, characterised in that the chain straps (2) on the outer sides of the chain strands are provided with at least one marking (16,17) in order to determine the orientation of the chain straps (2) with respect to the centre plane ($S_2$) containing the axes of rotation.

3. Energy guiding chain according to claim 2, characterised in that the first stop is a double-acting stop comprising two first and second atop surfaces (9,9;13,13) and the second stop is a double-acting stop comprising two third and fourth stop surfaces (8,8;12,12) for restricting the angling of the curved section as well as the self-supporting section of the upper strand of the chain.

4. Energy guiding chain according to claim 1, characterised in that the first stop is a double-acting stop comprising two first and second stop surfaces (9,9;13,13) and the second stop is a double-acting stop comprising two third and fourth stop surfaces (8,8;12,12) for restricting the angling of the curved section as well as the self-supporting section of the upper strand of the chain.

5. Energy guiding chain (1) according to claim 1, characterised in that the chain straps provided for a change of their orientation by an angle of 180° are the outer straps.

6. Energy guiding chain according to claim 5, characterised in that the chain straps (2) on the outer sides of the chain strands are provided with at least one marking (16,17) in order to determine the orientation of the chain straps (2) with respect to the centre plane ($S_2$) containing the axes of rotation.

7. Energy guiding chain according to claim 5, characterised in that the first stop is a double-acting stop comprising two first and second stop surfaces (9,9;13,13) and the second stop is a double-acting stop comprising two third and fourth stop surfaces (8,8;12,12) for restricting the angling of the curved section as well as the self-supporting section of the upper strand of the chain.

8. Energy guiding chain (1) according to claim 5, characterised in that the first stop surfaces (13) of the outer straps (4) are positioned parallel and the second stop surfaces (12) of the outer straps (4) are positioned slightly inclined with respect to the centre plane ($S_2$) containing the axes of rotation.

9. Energy guiding chain according to claim 8, characterised in the first stop is a double-acting stop comprising two first and second stop surfaces (9,9;13,13) and the second stop is a double-acting stop comprising two third and fourth stop surfaces (8,8;12,12) for restricting the angling of the curved section as well as the self-supporting section of the upper strand of the chain.

10. Energy Guiding chain (1) according to claim 1, characterised in that the first and third stop surfaces (9,8) and the second and fourth stop surfaces (13,12), respectively, on the inner straps (3) and the outer straps (4) are positioned asymmetrically with respect to the centre plane ($S_2$) in such a way that after changing the orientation either of the inner straps (3) or of the outer straps (4) about the centre axis ($S_3$) by an angle of 180° the curved section receives a slightly different curvature.

11. Energy guiding chain according to claim 10, characterised in that the chain straps (2) on the outer sides of the chain strands are provided with at least one marking (16,17) in order to determine the orientation of the chain straps (2) with respect to the centre plane ($S_2$) containing the axes of rotation.

12. Energy guiding chain according to claim 10, characterised in that the first stop is a double-acting stop comprising two first and second stop surfaces (9,9;13,13) and the second stop is a double-acting stop comprising two third and fourth stop surfaces (8,8;12,12) for restricting the angling of the curve section as well as the self-supporting section of the upper strand of the chain.

13. Energy guiding chain (1) according to claim 10, characterised in that the chain straps provided for a change of their orientation by an angle of 180° are the outer straps.

14. Energy guiding chain (1) according to claim 13, characterized in that the second stop surface (13) of the outer strap (4) is positioned parallel and the fourth stop surface (12) of the outer strap (4) is positioned slightly inclined with respect to the centre plane ($S_2$) containing the axes of rotation.

15. Energy guiding chain according to claim 13, characterised in that the chain straps (2) on the outer sides of the chain strands are provided with at least one marking (16,17) in order to determine the orientation of the chain straps (2) with respect to the centre plane ($S_2$) containing the axes of rotation.

16. Energy guiding chain according to claim 1 or 10, characterised in that the first and third stop surfaces (9,8) and the second and fourth stop surfaces (13,121, respectively, are positioned mirror-symmetrically with respect to the centre axis ($S_1$) of the chain straps (2) running perpendicular to the longitudinal direction of the chain.

17. Energy guiding chain according to claim 16, characterised in that the chain straps (2) on the outer sides of the chain strands are provided with at least one marking (16,17) in order to determine the orientation of the chain straps (2) with respect to the centre plane ($S_2$) containing the axes of rotation.

18. Energy guiding chain according to claim 16, characterised in that the first stop is a double-acting stop comprising two first and second stop surfaces (9,9;13,13) and the second stop is a double-acting stop comprising two third and fourth stop surfaces (8,8;12,12) for restricting the angling of the curved section as well as the self-supporting section of the upper strand of the chain.

19. Energy guiding chain (1) according to claims 16, characterised in that the chain straps provided for a change of their orientation by an angle of 180° are the outer straps.

20. Energy guiding chain (1) according to claim 19, characterised in that the second stop surface (13) of the outer strap (4) is positioned parallel and the fourth stop surface (12) of the outer strap (4) is positioned slightly inclined with respect to the centre plane ($S_2$) containing the axes of rotation.

21. Energy guiding chain according to claim 19, characterised in that the chain straps (2) on the outer sides of the chain strands are provided with at least one marking (16,17) in order to determine the orientation of the chain straps (2) with respect to the centre plane ($S_2$) containing the axes of rotation.

* * * * *

UNITED STATES PATENT AND TRADEMARK OFFICE
CERTIFICATE OF CORRECTION

PATENT NO.    : 6,371,876 B1
DATED         : April 16, 2002
INVENTOR(S)   : Gunter Blase It is certified that error appears in the above-identified patent and that said Letters Patent is hereby corrected as shown below:

Title page,
Item [75], the name of the Assignee should be -- Igus Spritzgußteile für die Industrie GmbH -- and not "...SpritzguBteile..."
Item [54], title, delete "POWER SUPPLY CHAIN" and insert therein -- ENERGY GUIDING CHAIN --
Item [57], ABSTRACT,
Line 6, after "alternating chain" delete "storage" and insert therein -- straps --.

Column 2,
Line 8, after "upper strand," delete "this" and insert therein -- thus --.

Column 3,
Line 10, after "surfaces of the outer" delete "surfaces" and insert therein -- straps --.

Column 6,
Line 51, after "fourth stop surfaces" delete "(13, 121" and insert therein
-- (13, 12) --.

Column 7,
Line 1, after "according to" delete "claims" and insert therein -- claim --.

Signed and Sealed this

Tenth Day of June, 2003

JAMES E. ROGAN
*Director of the United States Patent and Trademark Office*